(12) United States Patent
Budaker et al.

(10) Patent No.: US 6,810,985 B1
(45) Date of Patent: Nov. 2, 2004

(54) STEERING DEVICE FOR A VEHICLE

(75) Inventors: Martin Budaker, Heubach (DE); Walter Kogel, Neubronn (DE)

(73) Assignee: ZF Lenksysteme GmbH, Schwäbisch Gmüun (DE)

(*) Notice: Subject to any disclaimer, the term of this patent is extended or adjusted under 35 U.S.C. 154(b) by 4 days.

(21) Appl. No.: 10/149,692

(22) PCT Filed: Nov. 25, 2000

(86) PCT No.: PCT/EP00/11760

§ 371 (c)(1), (2), (4) Date: Sep. 5, 2002

(87) PCT Pub. No.: WO01/44037

PCT Pub. Date: Jun. 21, 2001

(30) Foreign Application Priority Data

Dec. 17, 1999 (DE) .......................... 199 61 018
Jul. 1, 2000 (DE) .......................... 100 32 120

(51) Int. Cl.[7] .............................. F16H 25/02
(52) U.S. Cl. .................... 180/444; 74/424.81
(58) Field of Search ............... 74/424.81–424.88; 180/443, 444

(56) References Cited

U.S. PATENT DOCUMENTS

| | | | |
|---|---|---|---|
| 2,380,662 A | 7/1945 | Means, Jr. | |
| 4,593,780 A | 6/1986 | Saito | |
| 4,924,696 A | * 5/1990 | Schroeder et al. | 73/118.1 |
| 5,685,390 A | * 11/1997 | Chikuma et al. | 180/444 |
| 5,927,429 A | * 7/1999 | Sugino et al. | 180/444 |
| 6,041,885 A | * 3/2000 | Watanabe et al. | 180/444 |
| 6,454,042 B1 | * 9/2002 | Yoshida et al. | 180/444 |

FOREIGN PATENT DOCUMENTS

| | | |
|---|---|---|
| DE | 37 08 059 | 10/1987 |
| DE | 37 35 517 | 4/1992 |
| DE | 43 40 203 | 5/1994 |
| DE | 42 43 267 | 6/1994 |
| DE | 197 23 358 | 12/1998 |
| DE | 198 22 478 | 12/1998 |
| DE | 298 20 079 | 2/1999 |
| DE | 197 50 585 | 6/1999 |
| DE | 198 52 447 | 6/1999 |
| DE | 100 16 197 | 10/2000 |
| DE | 199 31 850 | 1/2001 |
| EP | 0 376 457 | 7/1990 |
| EP | 0 870 669 | 10/1998 |
| EP | 0 890 499 | 1/1999 |
| EP | 1 016 581 | 7/2000 |
| FR | 2 596 722 | 10/1987 |
| JP | 11-182643 | 7/1999 |
| WO | WO99/16654 | 4/1999 |

* cited by examiner

*Primary Examiner*—Lesley D. Morris
*Assistant Examiner*—Matthew Luby
(74) *Attorney, Agent, or Firm*—Kenyon & Kenyon

(57) ABSTRACT

A steering device for a vehicle includes an electric motor. A drive element pertaining to the electric motor acts directly upon a connecting rod via a gear and a helical gear.

12 Claims, 4 Drawing Sheets

STEERING DEVICE FOR A VEHICLE

FIELD OF THE INVENTION

The invention relates to a steering device for motor vehicles.

BACKGROUND INFORMATION

Steering devices for motor vehicles transmit a steering intention introduced by way of a steering wheel to a final control element, also called a steering actuator.

In the case of electrically assisted steering devices, power assistance is provided by an electric motor. This may be a power-assisted steering system or a power steering system.

The power assistance may be provided at various points and by various arrangements, depending on the arrangement of the steering device.

In the case of large steering forces and high steering axle loads, the electric motor concentrically surrounds a connecting rod and transmits the power assistance directly to the connecting rod by way of a recirculating ball mechanism. These arrangements are often used in steer-by-wire and rear axle steering systems.

This arrangement has the disadvantage that only small transmission ratios between the driving side and the driven side can be accommodated. Consequently, the electric motor must be capable of delivering a high torque even at low speeds. This can be achieved only by modifying the size of the electric motor accordingly, which means that more overall space must be made available. Due to the immediate proximity to other units, such as the vehicle engine or differential, for example, this additional overall space required can only rarely be found. Moreover, the radiated heat emission from these units may have an adverse effect on the functioning of the steering system, especially the electric motor.

In the case of average demands on the steering device in respect of steering force and steering axle load, the electric motor acts on a drive pinion, which is operatively connected to a connecting rod. In one variant, these steering devices have two drive pinions, one drive pinion being operatively connected to a steering wheel by way of a steering column and a second drive pinion being driven via the electric motor.

These steering devices may offer advantages with regard to the degrees of freedom of the spatial arrangement of the electric motor and the avoidance of conflict with other units. The disadvantage to these steering devices is the fact that the maximum transmissible torque is limited by the drive pinion/connecting rod toothing. In the case of the steering device having two drive pinions, there is the added problem that two toothing systems run together on one connecting rod within a close tolerance zone, in order that they mesh with both drive pinions virtually free of backlash.

The steering device for motor vehicles described in German Published Patent Application No. 198 52 447 has an input shaft, which is operatively connected to a steering wheel by way of a torsionally elastic element. The rotational movement introduced is relayed by way of a planetary gear train to an output member in the form of a drive pinion, and transmitted to a connecting rod. In addition an electric motor acts on the planetary gear train and hence also on the output member by way of a worm gear.

The combination of planetary gear train and worm gear makes this steering device very costly and expensive, since the toothing systems must run free of backlash in order to satisfy the quality requirements with regard to noise and comfort.

This places particularly high demands on toothing quality and support for the components moving in relation to one another.

European Published Patent Application No. 0 870 669 describes a steering device with power-assisting electric motor, which by way of a gear is capable of turning a threaded nut, which by means of a recirculating ball mechanism produces an axial displacement of a connecting rod. At the same time, the recirculating ball mechanism is axially offset in relation to a ball bearing of the threaded nut, which for functional reasons must also have a further bearing for the support in a housing.

U.S. Pat. No. 4,593,780 describes a further steering device with threaded nut, which is likewise supported by two ball bearings.

It is an object of the present invention to make do with one less point of support than in conventional steering devices. This may provide the advantage of providing a steering device which may be used for all different installation variants while at the same time taking up little space and being capable of transmitting a high torque. In addition the electric motor may be flexibly arranged and the steering permits a high transmission ratio from the driving side to the driven side.

SUMMARY

The above and other beneficial objects of the present invention are achieved by providing a steering device for motor vehicles as described herein.

This object may be achieved, in particular, in that the steering power assistance generated by an electric motor as a function of a set value predetermined via the steering wheel is transmitted directly to a helical gear by way of a gear. The steering power assistance is transmitted by way of the helical gear to a connecting rod, which is connected to the steered wheels of a motor vehicle. The rotational movement imparted by the electric motor is therefore converted by the helical gear into a translational movement. The helical gear has a recirculating ball mechanism, in order to ensure quiet, functioning with low wear and a simultaneously high efficiency. The helical gear is also capable of transmitting significantly greater forces than a drive pinion/connecting rod combination.

Directly combining the two gear mechanisms produces a direct power flow from the electric motor to the actuator. Much higher transmission ratios may thereby be accommodated than with conventional steering devices, making it possible to reduce the torque that has to be applied by the electric motor. At the same time, this makes it possible to use smaller electric motors, which run at high speeds and have a better efficiency. The tolerance and alignment problems that occur with a drive pinion/connecting rod combination as a result of two toothing systems running together or a steering device with an electric motor, rigidly supported by way of two bearings in a housing and acting on the connecting rod, do not occur in the case of the steering device according to the present invention. On a screw thread side the connecting rod is supported in the housing solely by one bearing. Through suitable choice of the bearing, such as ball bearings, which are capable of bridging an angular position of up to 30 angular minutes, it is possible to compensate for the production tolerances.

The reduced motor torque required means that the gear is less heavily loaded, so that alternative materials may also be used. Such material may be plastic which, due to fatigue strength problems, may be used in conventional arrangements only in a reinforced form.

In one example embodiment, the transmission may be a friction gear, which may provide advantages with regard to efficiency and absence of backlash. Moreover, in the event of overload some slipping is possible, so that an additional safety-friction clutch for overload protection may be eliminated. Another alternative is a gear mechanism with slightly beveled cylindrical gears, in which the backlash compensation may be managed by an adjusting screw or a compression spring.

The principles underlying various exemplary embodiments of the present invention are described below with reference to the Figures.

DETAILED DESCRIPTION

Figure 1:
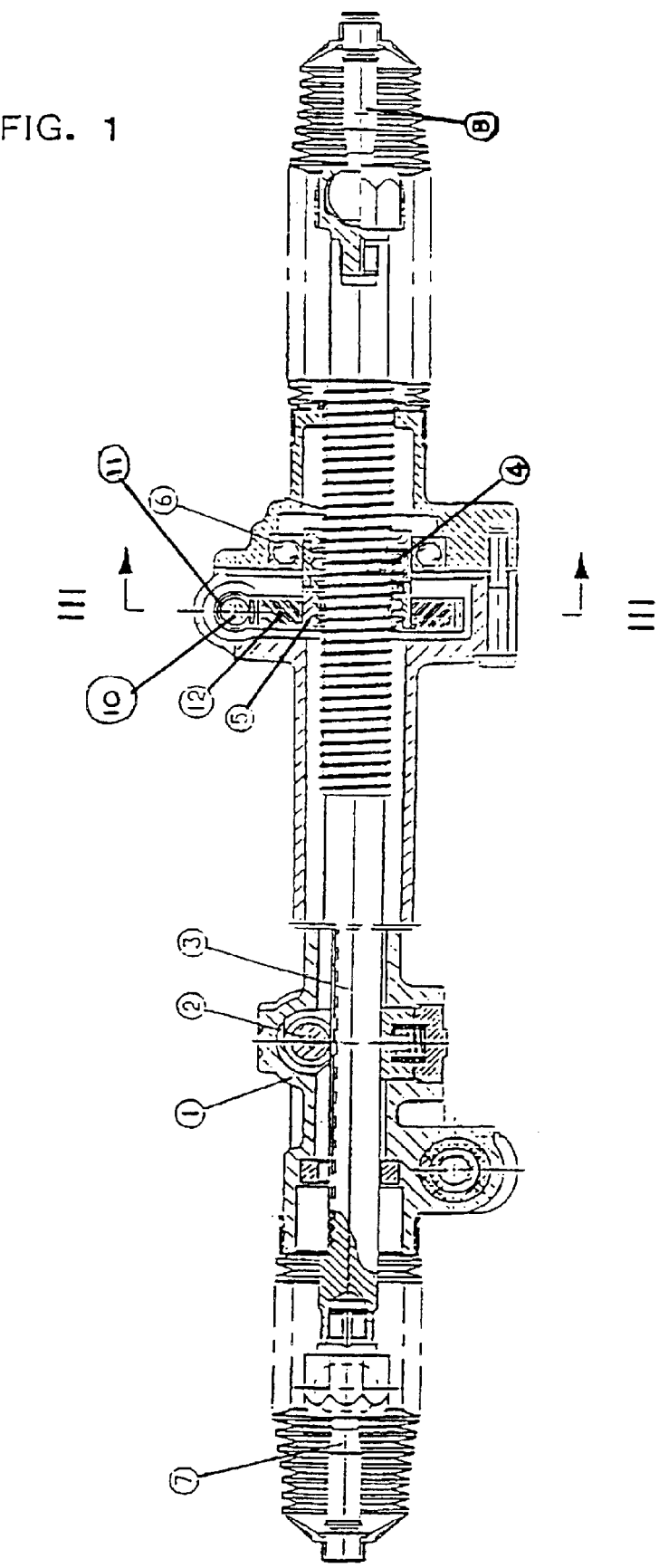
FIG. 1 illustrates a first exemplary embodiment of a motor vehicle steering device according to the present invention in the form of a rack and pinion steering system.

FIG. 1 illustrates a motor vehicle steering device according to the present invention, in which a drive pinion 2 is rotatably mounted in a housing 1. With its toothing, the drive pinion 2 meshes with a connecting rod 3, which is guided and axially displaceable in the housing 1. The drive pinion 2 may be operatively connected to a steering wheel by way of a mechanical steering column. In a variant, an electric motor, which is connected to the steering wheel by way of a control system, acts on the drive pinion 2. The connecting rod has a screw thread, which takes the form of a recirculating ball mechanism. The connecting rod 3 is supported in the housing 1 by a ball thread 4, a steering nut 5 and a bearing 6. The connecting rod 3 is operatively connected by track rods 7 and 8 to steered wheels of a motor vehicle. Power assistance, generated by an electric motor 9, illustrated in FIG. 3, as a function of a steering moment applied by way of the steering wheel, is transmitted by way of a worm gear 12 to the steering nut 5. At the same time a drive element 10 of the electric motor 9 has a worm 11, which meshes with the worm gear 12 so that worm 11 and worm gear 12 form a complete gear. This worm gear 12 positively interlocks with the steering nut. The power assistance applied by the electric motor 9 is transmitted to the connecting rod 3 and the rotational movement of the drive element 10 of the electric motor 9 translated into a linear movement of the connecting rod 3.

Figure 2:
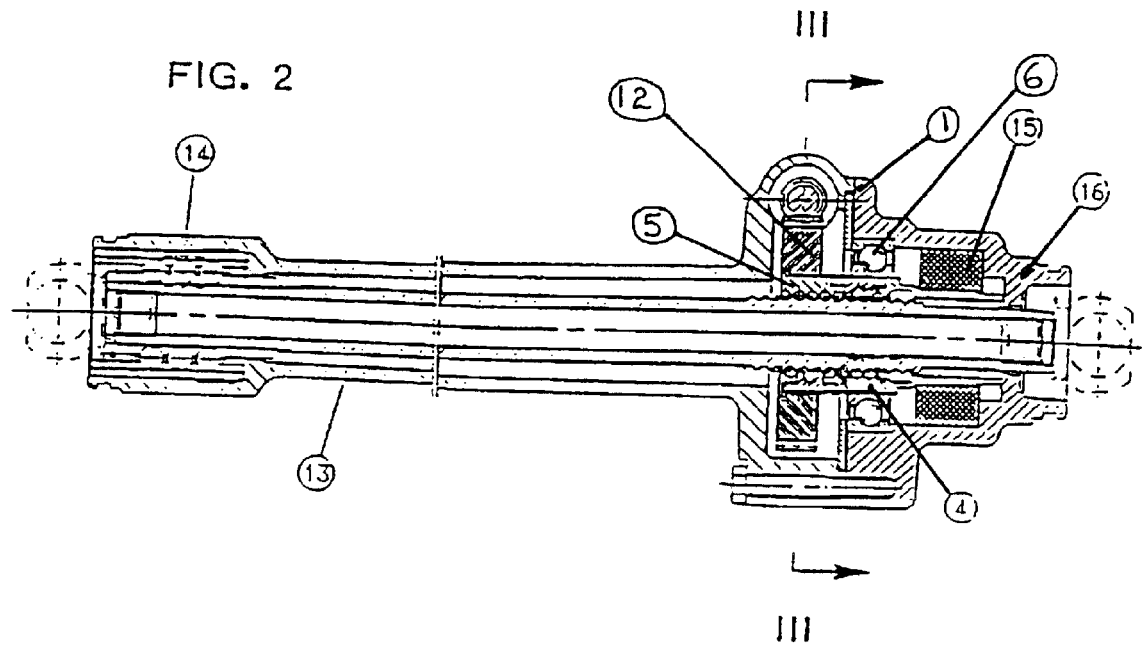
FIG. 2 illustrates a second exemplary embodiment of a motor vehicle steering device according to the present invention as an actuator for a steered wheel.

FIG. 2 illustrates a further exemplary embodiment of a motor vehicle steering device according to the present invention in the form of an actuator for a steered wheel. The connecting rod 13 has a screw thread, which takes the form of a recirculating ball mechanism. The connecting rod 13 is supported in the housing 1 by a ball thread 4, a steering nut 5 and a bearing 6.

A bearing 14 guides the connecting rod 13 linearly and prevents it from twisting. The connecting rod 13 is operatively connected to steered wheels of a motor vehicle. Power assistance, generated by an electric motor 9, illustrated in FIG. 3, as a function of a steering moment applied by way of the steering wheel, is transmitted by way of a worm gear 12 to the steering nut 5. At the same time a drive element 10 of the electric motor 9 has a worm 11, which meshes with the worm gear 12. This worm gear 12 positively interlocks with the steering nut 5. The power assistance applied by the electric motor 9 is transmitted to the connecting rod 13 and the rotational movement of the drive element 10 of the electric motor 9 translated into a linear movement of the connecting rod 13.

A sensor 15, which registers axial displacement, is incorporated between the housing 1 and an extension 16 of the steering nut 5.

Figure 3:
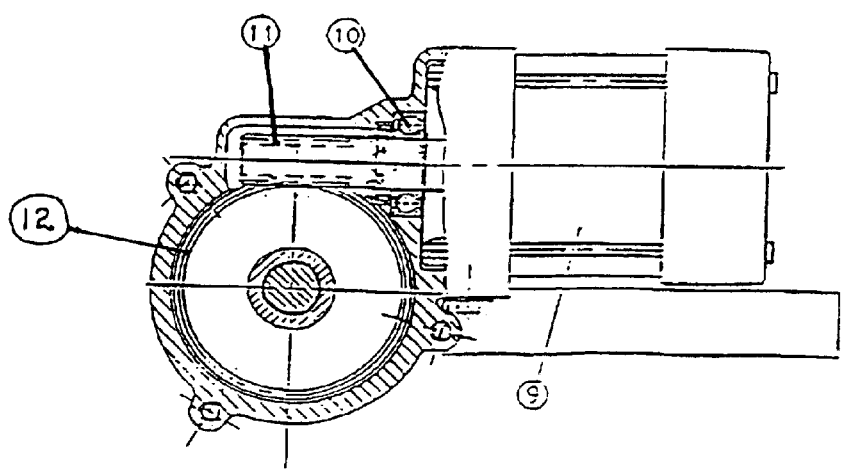
FIG. 3 is a cross-sectional view taken along the line III—III illustrated in FIG. 1 and FIG. 2.

FIG. 3 illustrates a possible gear in the form of a worm 11 and a worm gear 12, which is operatively connected to the drive element 10 of the electric motor 9.

Figure 4:
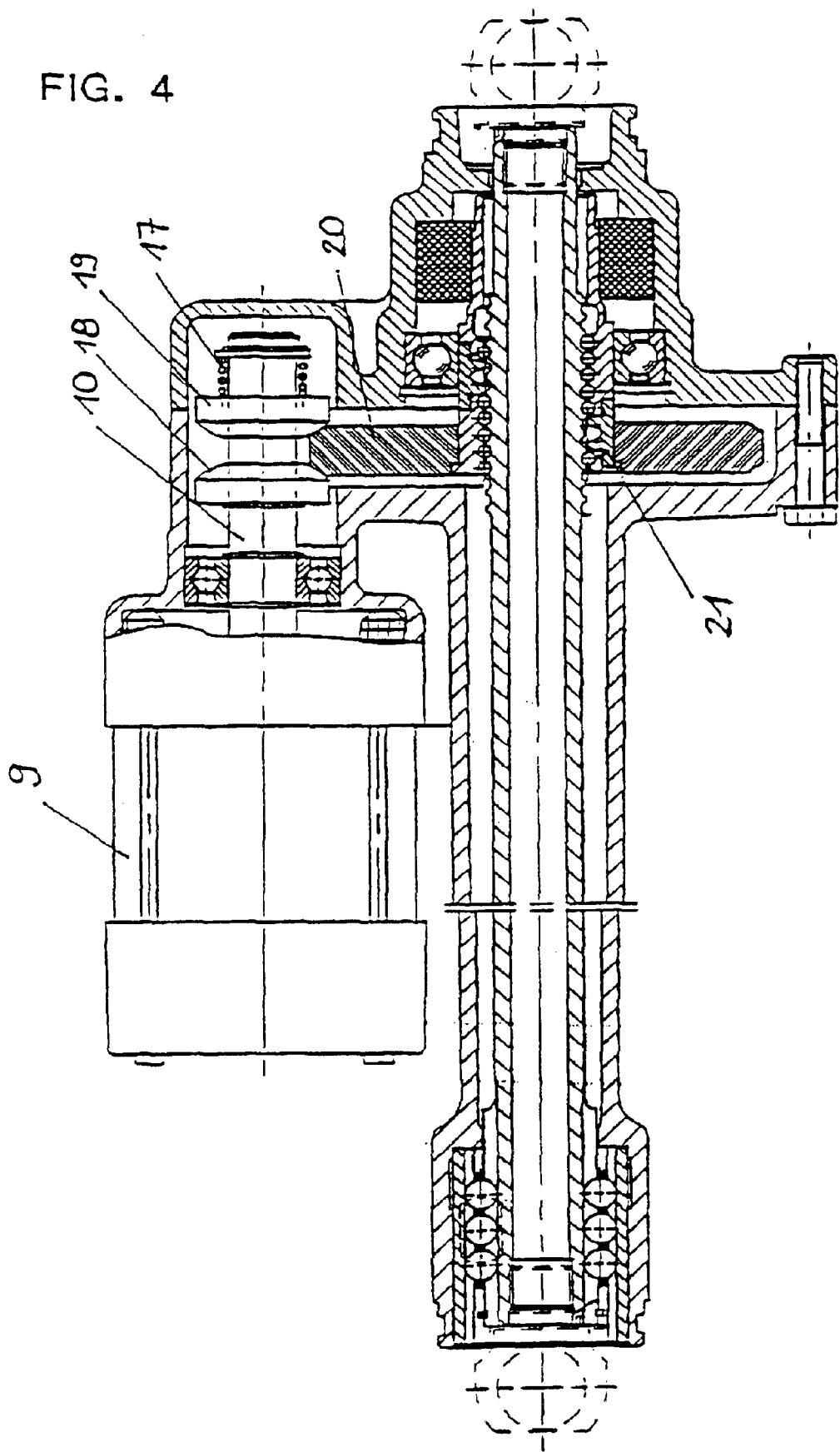
FIG. 4 illustrates a third exemplary embodiment of a motor vehicle steering device according to the present invention with a friction gear mechanism.

FIG. 4 illustrates a further exemplary embodiment of the present invention. The drive element 10 of the electric motor 9 carries friction disks 18 and 19, preloaded by a spring 17, which by way of a friction disk 20 transmit the torque of the electric motor 9 directly to a helical gear 21.

Figure 5:
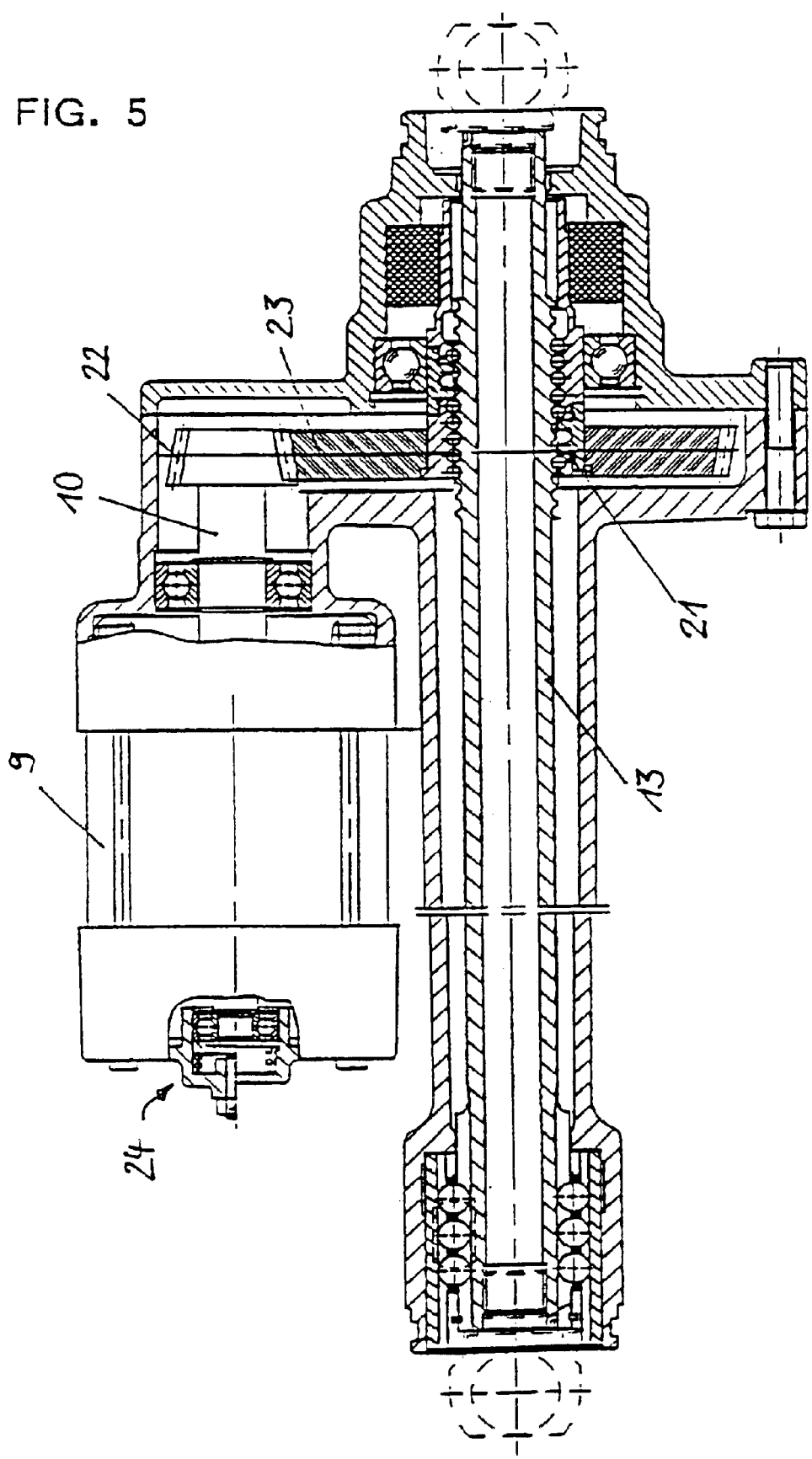
FIG. 5 illustrates a further exemplary embodiment of a motor vehicle steering device according to the present invention with a cylindrical gear mechanism.

FIG. 5 illustrates another exemplary embodiment of the present invention, in which the drive element 10 of the electric motor 9 carries a cylindrical gear 22, which meshes with a cylindrical gear 23. The cylindrical gear 23 is rotationally fixed to the helical gear 21, so that a direct drive exists from the electric motor 9 to the connecting rod 13. The cylindrical gears 22 and 23 may be adjusted by way of an adjusting mechanism 24 so that there is no backlash between them.

REFERENCE NUMBERS

1. Housing
2. Drive pinion
3. Connecting Rod
4. Ball thread
5. Steering nut
6. Bearing
7. Track rod
8. Track rod
9. Electric motor
10. Drive element
11. Worm
12. Worm gear
13. Connecting rod
14. Bearing
15. Sensor
16. Extension
17. Spring
18. Friction disk
19. Friction disk
20. Friction disk
21. Helical gear
22. Cylindrical gear
23. Cylindrical gear
24. Adjusting mechanism

What is claimed is:
1. A steering device for a motor vehicle, comprising:
an electric motor including a drive element;
a gear;
a bearing;
a housing;

a connecting rod including a screw thread side supported in the housing solely by the bearing; and a helical gear including a recirculating ball mechanism having a ball nut, the ball nut including a ball thread;

wherein the drive element of the electric motor is operatively connected to the gear, the motor configured to act directly on the helical gear and the connecting rod by way of the gear; and wherein the bearing is configured to grip around the ball thread of the ball nut within an area occupied by balls of the recirculating ball mechanism.

2. The steering device according to claim 1, further comprising a sensor incorporated into the housing, the sensor configured to register displacement of the connecting rod.

3. The steering device according to claim 1, further comprising a further bearing configured to linearly guide the connecting rod on a side of the connecting rod remote from the screw thread side.

4. The steering device according to claim 1, further comprising a worm gear, the drive element including a worm configured to act on the helical gear by way of the worm gear.

5. The steering device according to claim 1, further comprising at least one first friction disk connected to the drive element and operatively connected to the helical gear by way of a second friction disk.

6. The steering device according to claim 1, further comprising a first cylindrical gear, the drive element including a second cylindrical gear configured to act on the helical gear by way of the first cylindrical gear.

7. The steering device according to claim 5, further comprising a spring configured to adjust the gear free of backlash.

8. The steering device according to claim 6, further comprising a spring configured to adjust the gear free of backlash.

9. The steering device according to claim 1, wherein the bearing includes a ball bearing.

10. The steering device according to claim 1, further comprising a drive pinion configured to act on the connecting rod.

11. The steering device according to claim 1, wherein the connecting rod is configured to connect to a set of wheels of the motor vehicle, the set of wheels configured to shift in response to a displacement of the connecting rod.

12. The steering device according to claim 1, wherein the motor is configured to act in response to a steering moment applied via a steering wheel.

* * * * *